(12) United States Patent
Joshi

(10) Patent No.: US 7,280,483 B2
(45) Date of Patent: Oct. 9, 2007

(54) SYSTEM AND METHOD TO IMPROVE THE NETWORK PERFORMANCE OF A WIRELESS COMMUNICATIONS NETWORK BY FINDING AN OPTIMAL ROUTE BETWEEN A SOURCE AND A DESTINATION

(75) Inventor: Avinash Joshi, Orlando, FL (US)

(73) Assignee: MeshNetworks, Inc., Maitland, FL (US)

( * ) Notice: Subject to any disclaimer, the term of this patent is extended or adjusted under 35 U.S.C. 154(b) by 411 days.

(21) Appl. No.: 10/863,183

(22) Filed: Jun. 7, 2004

(65) Prior Publication Data

US 2004/0252643 A1   Dec. 16, 2004

Related U.S. Application Data

(60) Provisional application No. 60/546,940, filed on Feb. 24, 2004, provisional application No. 60/546,941, filed on Feb. 24, 2004, provisional application No. 60/476,237, filed on Jun. 6, 2003, provisional application No. 60/476,236, filed on Jun. 6, 2003, provisional application No. 60/475,882, filed on Jun. 5, 2003.

(51) Int. Cl.
  *H04L 12/28* (2006.01)
  *H04Q 7/00* (2006.01)
(52) U.S. Cl. ............... 370/238; 370/232; 370/230.1; 370/312; 370/349; 370/390; 709/241
(58) Field of Classification Search ............. 370/230, 370/230.1, 232, 235–238, 248, 249, 252, 370/312, 313, 315, 328, 329, 349, 356, 389, 370/390, 392, 400, 401, 432, 477; 709/241
See application file for complete search history.

(56) References Cited

U.S. PATENT DOCUMENTS

| 4,494,192 A | 1/1985 | Lew et al. |
| 4,617,656 A | 10/1986 | Kobayashi et al. |
| 4,736,371 A | 4/1988 | Tejima et al. |
| 4,742,357 A | 5/1988 | Rackley |
| 4,747,130 A | 5/1988 | Ho |
| 4,910,521 A | 3/1990 | Mellon |
| 5,034,961 A | 7/1991 | Adams |
| 5,068,916 A | 11/1991 | Harrison et al. |
| 5,231,634 A | 7/1993 | Giles et al. |
| 5,233,604 A | 8/1993 | Ahmadi et al. |
| 5,241,542 A | 8/1993 | Natarajan et al. |
| 5,317,566 A | 5/1994 | Joshi |

(Continued)

FOREIGN PATENT DOCUMENTS

CA   2132180   3/1996

(Continued)

OTHER PUBLICATIONS

Wong, et al., "Soft Handoffs in CDMA Mobile Systems," Dec. 1997, IEEE Personal Communications.

(Continued)

*Primary Examiner*—Chi Pham
*Assistant Examiner*—Ahmed Elallam
(74) *Attorney, Agent, or Firm*—Randi L. Karpinia; Joseph J. Buczynski

(57) ABSTRACT

A system and method for calculating an optimal route at a node by making use of routing metrics which if carefully chosen, can provide stability to the network and also provide features like Self Healing and Load Balancing. A Routing metric is calculated as a scalar number based upon a number of factors, such as number of hops, data rate, link quality and device type. Each factor can be determined by evaluation of Hello messages, or other routing messages as required.

14 Claims, 4 Drawing Sheets

U.S. PATENT DOCUMENTS

| | | |
|---|---|---|
| 5,392,450 A | 2/1995 | Nossen |
| 5,412,654 A | 5/1995 | Perkins |
| 5,424,747 A | 6/1995 | Chazelas |
| 5,502,722 A | 3/1996 | Fulghum |
| 5,517,491 A | 5/1996 | Nanni et al. |
| 5,555,425 A | 9/1996 | Zeller et al. |
| 5,555,540 A | 9/1996 | Radke |
| 5,572,528 A | 11/1996 | Shuen |
| 5,615,212 A | 3/1997 | Ruszczyk et al. |
| 5,618,045 A | 4/1997 | Kagan et al. |
| 5,621,732 A | 4/1997 | Osawa |
| 5,623,495 A | 4/1997 | Eng et al. |
| 5,627,976 A | 5/1997 | McFarland et al. |
| 5,631,897 A | 5/1997 | Pacheco et al. |
| 5,644,576 A | 7/1997 | Bauchot et al. |
| 5,652,751 A | 7/1997 | Sharony |
| 5,680,392 A | 10/1997 | Semaan |
| 5,684,794 A | 11/1997 | Lopez et al. |
| 5,687,194 A | 11/1997 | Paneth et al. |
| 5,696,903 A | 12/1997 | Mahany |
| 5,701,294 A | 12/1997 | Ward et al. |
| 5,706,428 A | 1/1998 | Boer et al. |
| 5,717,689 A | 2/1998 | Ayanoglu |
| 5,745,483 A | 4/1998 | Nakagawa et al. |
| 5,774,876 A | 6/1998 | Wooley et al. |
| 5,781,540 A | 7/1998 | Malcolm et al. |
| 5,787,080 A | 7/1998 | Hulyalkar et al. |
| 5,794,154 A | 8/1998 | Bar-On et al. |
| 5,796,732 A | 8/1998 | Mazzola et al. |
| 5,796,741 A | 8/1998 | Saito et al. |
| 5,805,593 A | 9/1998 | Busche |
| 5,805,842 A | 9/1998 | Nagaraj et al. |
| 5,805,977 A | 9/1998 | Hill et al. |
| 5,809,518 A | 9/1998 | Lee |
| 5,822,309 A | 10/1998 | Ayanoglu et al. |
| 5,844,905 A | 12/1998 | McKay et al. |
| 5,845,097 A | 12/1998 | Kang et al. |
| 5,857,084 A | 1/1999 | Klein |
| 5,870,350 A | 2/1999 | Bertin et al. |
| 5,877,724 A | 3/1999 | Davis |
| 5,881,095 A | 3/1999 | Cadd |
| 5,881,372 A | 3/1999 | Kruys |
| 5,886,992 A | 3/1999 | Raatikainen et al. |
| 5,896,561 A | 4/1999 | Schrader et al. |
| 5,903,559 A | 5/1999 | Acharya et al. |
| 5,909,651 A | 6/1999 | Chander et al. |
| 5,936,953 A | 8/1999 | Simmons |
| 5,943,322 A | 8/1999 | Mayer et al. |
| 5,987,011 A * | 11/1999 | Toh .................. 370/331 |
| 5,987,033 A | 11/1999 | Boer et al. |
| 5,991,279 A | 11/1999 | Haugli et al. |
| 6,028,853 A | 2/2000 | Haartsen |
| 6,029,217 A | 2/2000 | Arimilli et al. |
| 6,034,542 A | 3/2000 | Ridgeway |
| 6,044,062 A | 3/2000 | Brownrigg et al. |
| 6,047,330 A | 4/2000 | Stracke, Jr. |
| 6,052,594 A | 4/2000 | Chuang et al. |
| 6,052,752 A | 4/2000 | Kwon |
| 6,064,626 A | 5/2000 | Stevens |
| 6,067,291 A | 5/2000 | Kamerman et al. |
| 6,067,297 A | 5/2000 | Beach |
| 6,078,566 A | 6/2000 | Kikinis |
| 6,104,712 A | 8/2000 | Robert et al. |
| 6,108,738 A | 8/2000 | Chambers et al. |
| 6,115,580 A | 9/2000 | Chuprun et al. |
| 6,122,690 A | 9/2000 | Nannetti et al. |
| 6,130,881 A | 10/2000 | Stiller et al. |
| 6,132,306 A | 10/2000 | Trompower |
| 6,147,975 A | 11/2000 | Bowman-Amuah |
| 6,163,699 A | 12/2000 | Naor et al. |
| 6,178,337 B1 | 1/2001 | Spartz et al. |
| 6,192,053 B1 | 2/2001 | Angelico et al. |
| 6,192,230 B1 | 2/2001 | Van Bokhorst et al. |
| 6,208,870 B1 | 3/2001 | Lorello et al. |
| 6,222,463 B1 | 4/2001 | Rai |
| 6,222,504 B1 | 4/2001 | Oby |
| 6,223,240 B1 | 4/2001 | Odenwald et al. |
| 6,240,294 B1 | 5/2001 | Hamilton et al. |
| 6,246,875 B1 | 6/2001 | Seaholtz et al. |
| 6,249,516 B1 | 6/2001 | Brownrigg et al. |
| 6,275,707 B1 | 8/2001 | Reed et al. |
| 6,285,892 B1 | 9/2001 | Hulyalkar |
| 6,304,556 B1 | 10/2001 | Haas |
| 6,327,300 B1 | 12/2001 | Souissi et al. |
| 6,349,091 B1 | 2/2002 | Li |
| 6,349,210 B1 | 2/2002 | Li |
| 6,359,872 B1 | 3/2002 | Mahany et al. |
| 6,363,319 B1 * | 3/2002 | Hsu ........................ 701/202 |
| 6,366,568 B1 | 4/2002 | Bolgiano et al. |
| 6,405,049 B2 | 6/2002 | Herrod et al. |
| 6,633,544 B1 * | 10/2003 | Rexford et al. ............. 370/238 |
| 6,646,989 B1 * | 11/2003 | Khotimsky et al. ......... 370/238 |
| 6,704,293 B1 * | 3/2004 | Larsson et al. ............. 370/255 |
| 6,728,484 B1 * | 4/2004 | Ghani ........................ 398/42 |
| 6,791,949 B1 * | 9/2004 | Ryu et al. .................. 370/254 |
| 6,813,272 B1 * | 11/2004 | An et al. ................ 370/395.21 |
| 6,940,832 B2 * | 9/2005 | Saadawi et al. ............ 370/328 |
| 6,961,310 B2 * | 11/2005 | Cain ........................ 370/238 |
| 6,963,927 B1 * | 11/2005 | Lee et al. ................... 709/241 |
| 7,007,102 B2 * | 2/2006 | Billhartz et al. ............ 709/238 |
| 7,027,426 B2 * | 4/2006 | Billhartz .................... 370/338 |
| 7,068,600 B2 * | 6/2006 | Cain ........................ 370/230.1 |
| 7,111,074 B2 * | 9/2006 | Basturk ..................... 709/241 |
| 7,159,035 B2 * | 1/2007 | Garcia-Luna-Aceves et al. ............. 709/241 |
| 7,177,295 B1 * | 2/2007 | Sholander et al. .......... 370/338 |
| 2001/0053699 A1 | 12/2001 | McCrady et al. |
| 2002/0013856 A1 | 1/2002 | Garcia-Luna-Aceves |
| 2002/0061001 A1 * | 5/2002 | Garcia-Luna-Aceves et al. ............. 370/338 |
| 2003/0026268 A1 * | 2/2003 | Navas ........................ 370/400 |
| 2003/0118027 A1 * | 6/2003 | Lee et al. ............... 370/395.21 |
| 2003/0179718 A1 * | 9/2003 | Ebata et al. ................ 370/255 |
| 2004/0029553 A1 * | 2/2004 | Cain ........................ 455/403 |
| 2004/0203820 A1 * | 10/2004 | Billhartz .................. 455/452.1 |
| 2004/0233847 A1 * | 11/2004 | Park et al. .................. 370/235 |
| 2004/0233855 A1 * | 11/2004 | Gutierrez et al. ........... 370/252 |
| 2004/0246900 A1 * | 12/2004 | Zhang et al. ............... 370/238 |

FOREIGN PATENT DOCUMENTS

| | | |
|---|---|---|
| EP | 0513841 A2 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Wong et al., "A Pattern Recognition System for Handoff Algorithms," Jul. 2000, IEEE Journal on Selected Areas in Communications, vol. 18, No. 7.

Andras G. Valko, "Cellular IP: A New Approach to Internet Host Mobility," Jan. 1999, ACM Computer Communication Review.

Richard North, Dale Bryan and Dennis Baker, "Wireless Networked Radios: Comparison of Military, Commercial and R&D Protocols," Feb. 28-Mar. 3, 1999, 2nd Annual UCSD Conference on Wireless Communications, San Diego, CA.

Benjamin B. Peterson, Chris Kmiecik, Richard Hartnett, Patrick M. Thompson, Jose Mendoza and Hung Nguyen, "Spread Spectrum Indoor Geolocation," Aug. 1998, Navigation: Journal of the Institute of Navigation, vol. 45, No. 2, Summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols," Oct. 25-30, 1998, Proceedings of the 4th Annual ACM/IEEE International Conference on Mobile Computing and Networking.

C. David Young, "USAP: A Unifying Dynamic Distributed Multichannel TDMA Slot Assignment Protocol", no date.

Chip Elliott and Bob Heile, "Self-Organizing, Self-Healing Wireless Networks," 2000 IEEE, no date.

J.J. Garcia-Luna-Aceves and Asimakis Tzamaloukas, "Reversing the Collision-Avoidance Handshake in Wireless Networks", no date.

J.J. Garcia-Luna-Aceves and Marcelo Spohn, "Transmission-Efficient Routing in Wireless Networks Using Link-State Information", no date.

J.J. Garcia-Luna-Aceves and Ewerton L. Madruga, "The Core-Assisted Mesh Protocol," Aug. 1999, IEEE Journal on Selected Areas in Communications, vol. 17, No. 8.

Ad Kamerman and Guido Aben, "Net Throughput with IEEE 802.11 Wireless LANs", no date.

J. R. McChesney and R.J. Saulitis, "Optimization of an Adaptive Link Control Protocol for Multimedia Packet Radio Networks", no date.

Ram Ramanathan and Regina Rosales-Hain, "Topology Control of Multihop Wireless Networks Using Transmit Power Adjustment", no date.

Ram Ramanathan and Martha E. Steenstrup, "Hierarchically-Organized, Multihop Mobile Wireless Networks for Quality-of-Service Support", no date.

Martha E. Steenstrup, "Dynamic Multipoint Virtual Circuits for Multimedia Traffic in Multihop Mobile Wireless Networks", no date.

Zhenya Tang and J.J. Garcia-Luna-Aceves, "Collision-Avoidance Transmission Scheduling for Ad-Hoc Networks", no date.

George Vardakas and Wendell Kishaba, "QoS Networking With Adaptive Link Control and Tactical Multi-Channel Software Radios", no date.

* cited by examiner

US 7,280,483 B2

SYSTEM AND METHOD TO IMPROVE THE NETWORK PERFORMANCE OF A WIRELESS COMMUNICATIONS NETWORK BY FINDING AN OPTIMAL ROUTE BETWEEN A SOURCE AND A DESTINATION

This application claims benefit under 35 U.S.C. § 119(e) from U.S. Provisional Patent Application Ser. No. 60/476,237, filed on Jun. 6, 2003, U.S. Provisional Patent Application Ser. No. 60/546,941, filed on Feb. 24, 2004, and U.S. Provisional Patent Application Ser. No. 60/546,940, filed on Feb. 24, 2004, U.S. Provisional Patent Application Ser. No. 60/476,236, filed on Jun. 6, 2003, and U.S. Provisional Patent Application Ser. No. 60/475,882, filed Jun. 5, 2003, the entire contents of each being incorporated herein by reference

BACKGROUND OF THE INVENTION

1. Field of the Invention

The present invention relates to a system and method for improving the network performance of a wireless communication network by finding an optimal route between a source and a destination. An optimal route is chosen by making use of routing metrics which if carefully chosen, can provide stability to the network and also provide features like Self Healing and Load Balancing.

2. Description of the Related Art

Wireless communication networks, such as mobile wireless telephone networks, have become increasingly prevalent over the past decade. These wireless communications networks are commonly referred to as "cellular networks", because the network infrastructure is arranged to divide the service area into a plurality of regions called "cells". A terrestrial cellular network includes a plurality of interconnected base stations, or base nodes, that are distributed geographically at designated locations throughout the service area. Each base node includes one or more transceivers that are capable of transmitting and receiving electromagnetic signals, such as radio frequency (RF) communications signals, to and from mobile user nodes, such as wireless telephones, located within the coverage area. The communications signals include, for example, voice data that has been modulated according to a desired modulation technique and transmitted as data packets. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format, which enables a single transceiver at a first node to communicate simultaneously with several other nodes in its coverage area.

In recent years, a type of mobile communications network known as an "ad-hoc" network has been developed. In this type of network, each mobile node is capable of operating as a base station or router for the other mobile nodes, thus eliminating the need for a fixed infrastructure of base stations. Details of an ad-hoc network are set forth in U.S. Pat. No. 5,943,322 to Mayor, the entire content of which is incorporated herein by reference.

More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet. Details of these advanced types of ad-hoc networks are described in U.S. Pat. No. 7,072,605 entitled "Ad Hoc Peer-to-Peer Mobile Radio Access System Interfaced to the PSTN and Cellular Networks", issued on Jul. 4, 2006, in U.S. Pat. No. 6,807,165 entitled "Time Division Protocol for an Ad-Hoc, Peer-to-Peer Radio Network Having Coordinating Channel Access to Shared Parallel Data Channels with Separate Reservation Channel", issued on Oct. 19, 2004 and in U.S. Pat. No. 6,873,839 entitled "Prioritized-Routing for an Ad-Hoc, Peer-to-Peer, Mobile Radio Access System", issued on Mar. 29, 2005, the entire content of each being incorporated herein by reference.

As can be appreciated by one skilled in the art, since certain nodes of the ad-hoc network are mobile, it is necessary for the network to maintain connectivity with those nodes. Transmitted data packets typically "hop" from mobile device to mobile device, creating a transmission path, or route, until reaching a final destination. However, transmission paths between mobile devices are often subject to change as devices move, therefore ad-hoc network communication must be able to adapt to achieve optimum performance while addressing the limited capabilities and capacities of mobile individual devices.

In a typical wireless communication network, the number of hops between the source and the destination is used as the routing metric. The lesser the number of hops the better the route. However, this can lead to un-optimal routes, as there can be a better route with more number of hops but better link quality or data rate.

Accordingly, a need exists for a system and method to discover optimal routes between a source and a destination in an efficient way using factors other than hops as the sole metrics.

SUMMARY OF THE INVENTION

An object of the present invention is to provide a system and method for locating optimal routes between a source and destination node using a broad range of Route metrics.

Another object of the present invention is to provide a system and method for calculating Route metrics using Hello messages exchanged in a network.

Another object of the present invention is to provide a system and method for calculating Route metrics using Routing messages, such as Route Request and Route Reply.

These and other objects are substantially achieved by providing a system and method for making use of routing metrics which if carefully chosen, can provide stability to the network and also provide features like Self Healing and Load Balancing. A Routing metric is calculated as a scalar number based upon a number of factors, such as number of hops, data rate, link quality and device type. Each factor can be determined by evaluation of Hello messages, or other routing messages as required.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

The embodiments of the present invention described below provide a method and system which improves the network performance of a wireless communication network by finding an optimal route between a source and a destination. An optimal route is the one which either has lower latency and/or higher throughput and/or better utilization of the network resources. This route is chosen by making use of the routing metrics which are described in greater detail below. If carefully chosen, routing metrics can provide stability to the network and also provide features like Self Healing and Load Balancing.

Figure 1:
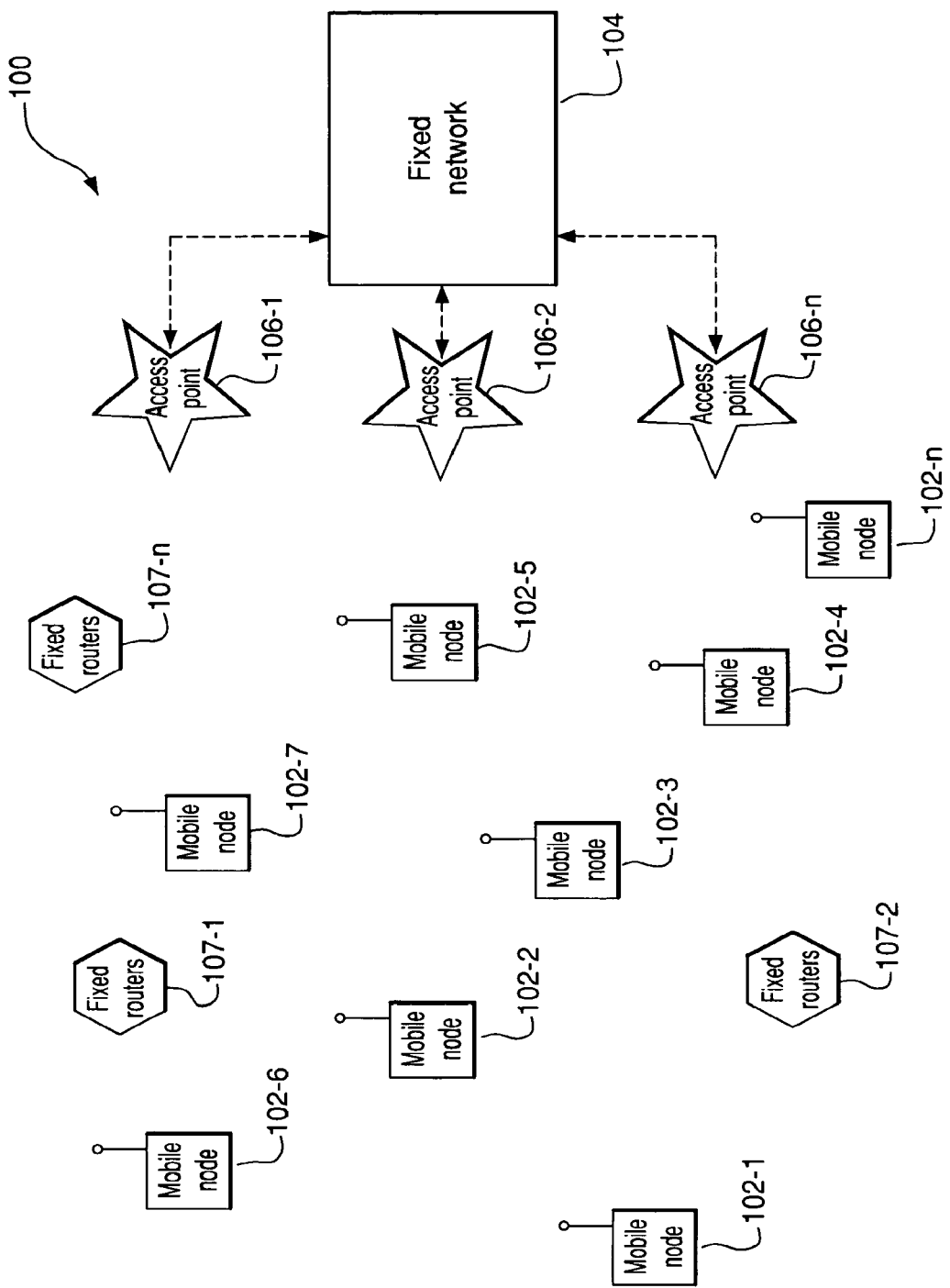
FIG. 1 is a block diagram of an example ad-hoc wireless communications network including a plurality of nodes in accordance with an embodiment of the present invention.

In a typical wireless communication network, such as network 100 of FIG. 1, number of hops between the source and the destination is typically used as the routing metric. The lesser the number of hops the better the route. As noted above, this can lead to un-optimal routes, as there can be a better route with more number of hops but better link quality or data rate.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes 102 or mobile nodes 102), and can, but is not required to, include a fixed network 104 having a plurality of access points 106-1, 106-2, . . . 106-n (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-n (referred to generally as nodes 107 or fixed routers 107) for routing data packets between other nodes 102, 106 or 107. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in U.S. Pat. No. 5,943,322 to Mayor, and in U.S. Pat. Nos. 7,072,650, 6,807,165 and 6,873,839 referenced above.

Figure 2:
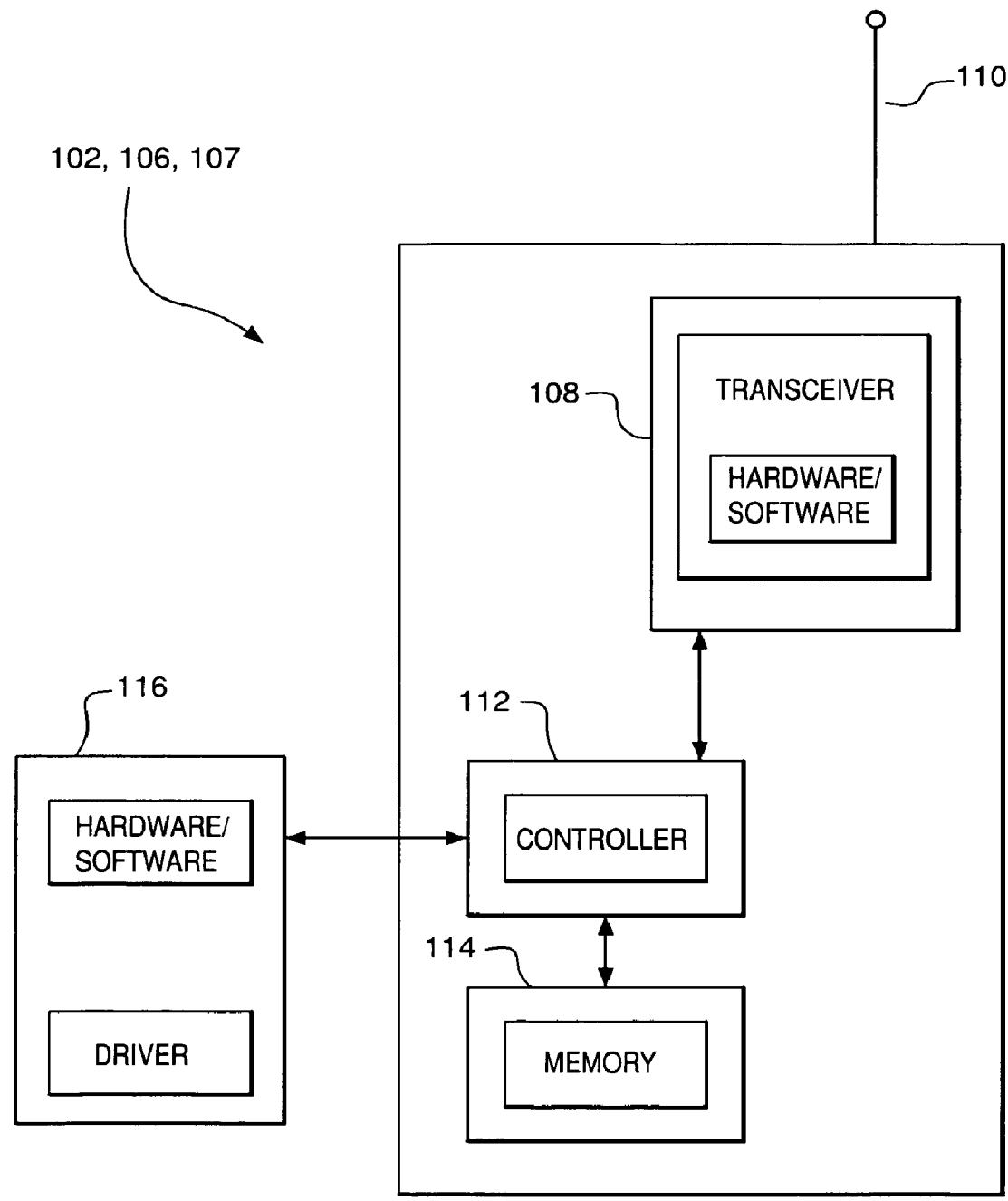
FIG. 2 is a block diagram illustrating an example of a mobile node employed in the network shown in FIG. 1.

As shown in FIG. 2, each node 102, 106 and 107 includes a transceiver, or modem 108, which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM) that is capable of storing, among other things, routing information pertaining to itself and other nodes in the network 100. As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

As noted above, number of hops between a source node and a destination node is typically used as the routing metric for selecting a route between nodes in a network such as network 100 of FIG. 1. This can lead to un-optimal routes, as there can be a better route with more number of hops but better link quality or data rate. The embodiments described below include the usage of other such metrics.

The routing metric is a scalar number which represents the cost between the source and the destination. The higher the cost, the worse is the route. The different factors which determines the cost can include, but are not limited to the following:

1. Number of hops between the source and the destination;
2. Data rate along the route from the source and the destination;
3. Link quality along the route from the source and the destination; and
4. Type of the device present as intermediate node between the source and the destination.

The use of these factors can be justified for the following category of reasons.

Number of Hops

In any network, the delay incurred by a packet at each hop is a function of the processing and queuing delays at the transmitting node and the transmission, including medium access, and propagation delays over the link. Thus, in a multihop network reducing the number of hops in a route may significantly reduce the end-to-end delays experienced by packets traversing the route. Routing backbones consisting of small numbers of long-range links are frequently employed to provide low-delay, high-speed connectivity between distant nodes in large networks.

In multi-hop wireless networks, the need for reduced route length is even greater than in wireline networks because of the larger delays likely to be experienced at each hop. These delays can include medium access delay resulting from contention for the shared channel, transmission delay resulting from increased packet size for error-control or direct-sequence spread-spectrum coding, retransmission delay resulting from link layer Automatic Repeat Request (ARQ) protocols for reliability over error-prone links, and radio-dependent delay such as that incurred when switching between transmission and reception modes.

Data Rate

A node could be using different data rate to different neighbors depending upon the reliability for the link. Given a choice, a node should use the highest data rate available to increase the throughput and thus, data rate should be a factor in the overall routing metric.

Link Quality

The quality of the link which can be a combined value of the RSSI level, Bit Error Rate, PDSQ values, timeouts and so forth, should also be a part of the metric to allow routing to pick a good quality link over a bad one.

Device Type

There are three different device types in a wireless network, such as a Mesh Network, namely subscriber devices (SD), wireless routers (WR) and intelligent access points (IAP). Given a choice of intermediate node (i.e. not the destination node) devices should choose a WR before an SD or an IAP so that devices do not drain out batteries of other SD devices and also do not make an IAP busy. Similarly devices should use an IAP before an SD as intermediate nodes for the same reason. There can be several other devices in such a network and hence type of device should be an important part of the overall routing metrics. An example of this is described in greater detail below.

The devices used in this kind of network typically have a module called an ATP. This module reports link quality for all MAC addresses that a node has communicated by exchanging data messages. The ATP can also provide the current data rate which is used to communicate with this neighbor. The link quality/data rate can be communicated to the other module, typically routing as a scalar number. A look up table can then be used to find out the reliability of the link and the data rate used. Additional details of an ATP and link quality are discussed in U.S. Pat. No. 6,904,021, entitled "System and Method for Providing Adaptive Control of Transmit Power and Data Rate in Ad-Hoc Networks", issued on Jun. 7, 2005; in U.S. Patent Publication Number 20040260808 entitled "A Method to Provide a Measure of Link Reliability to a Routing Protocol in an Ad Hoc Network", published Oct. 23, 2004; in U.S. Patent Publication Number 20040246935, entitled "System and Method for Characterizing the Quality of a Link in a Wireless Network", published on Dec. 09, 2004, the entire contents of each being incorporated herein by reference.

The following example shows a way to calculate a routing metric which is used in a system using a modified On Demand routing protocol. Details of such routing methods are further discussed in U.S. Patent Application Publication No. 20040143842 entitled "System and Method for Achieving Continuous Connectivity to an Access Point or Gateway in a Wireless Network Following an On-Demand Routing Protocol, and To Perform Smooth Handoff Of Mobile Terminals," published on Jul. 22, 2004; in U.S. Pat. No. 7,061,925 entitled "System and Method to Improve the Overall Performance of a Wireless Communication Network", issued on Jun. 13, 2006; and in U.S. Patent Application Publication No. 20040258040 entitled "System and Method to Maximize Channel Utilization in a Multi-Channel Wireless Communication Network", published on Dec. 23, 2004, the entire content of each being incorporated herein by reference. A Route Metric computation in accordance with an embodiment of the present invention is described in greater detail below.

In infrastructure mode, nodes find out about the routing metric to any destination other than an IAP through exchange of routing packets. Routing metrics to an IAP can be found by exchange of routing packets as well as hearing the hello packets from the neighbors. In case there is a difference in the routing metrics which is being computed from hello messages and that from routing packets, the hello message information is used. The following are Route metrics computation examples in accordance with an embodiment of the present invention.

Route Metrics to the LAP Through Hello Messages

A source node, following the protocol referred above, knows about the routes to the IAP and the route metric to reach it from its neighbors, which periodically broadcast this information in the Hellos. This metric is then added to the metric to the particular neighbor advertising the IAP. A bias is also added to differentiate between different types of nodes and prefer one over another. Mathematically, this can be represented in the following Equation (1) below.

$$R_{sd} = R_{sn} + R_{nd} + \text{Next Hop Bias} \tag{1}$$

where $R_{sd}$=Route metric between source and destination, $R_{sn}$=Route metric between source and next hop, $R_{nd}$=Route metric between next hop and destination (which next hop reported), and $R_{sn}$ i.e. Routing metric to the next hop or neighbor is calculated using the following Equation (2).

| $R_{sn} =$ | A constant number + | Different biases based on the quality of the link and the data rate |
|---|---|---|

Routing metric to destinations other than neighbors are calculated using the Equation (1) where an additional next hop bias is added based on the type of neighbor.

Figure 3:
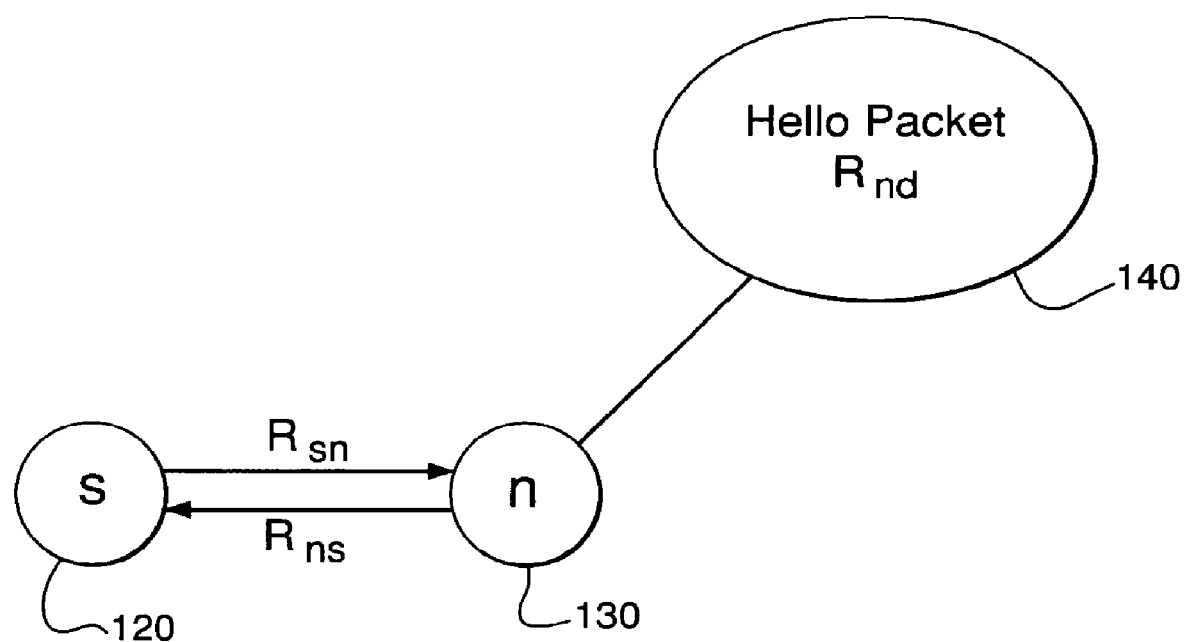
FIG. 3 is a conceptual block diagram illustrating an example of a Routing metric computation through Hello packets in accordance with an embodiment of the present invention.

In words the equation can be written as:

Routing metric to the destination=Routing metric to the next hop/neighbor+Routing metric from the next hop/neighbor to the Destination+Biased based on the type of next hop/neighbor The following example shown in FIG. 3 is presented to clarify the procedure. FIG. 3 is an example illustrating a Routing Metric Computation through hello packets in accordance with an embodiment of the present invention.

In this example 's' 120 is the current node which is trying to find the route to the destination, which is usually IAP, and 'n' 130 is its neighboring node advertising its route to the destination through hello packets. The hello packet 140 contains the routing metric from the neighbor to the destination which is $R_{nd}$. The routing metrics from 's' to 'n' is $R_{sn}$ and from 'n' to 's' is $R_{ns}$. The link may not be uniform and hence these values can be different. On receiving such a hello message, node 's' uses the Equation (1) above to find the routing metric to the destination which is $R_{sd}$. The nodes s and n can be any device (i.e. SD, WR or IAP). In case of IAP the advertised metric is zero.

Route Metrics to Other Destinations Through Routing Messages

Route Request (RREQ) and Route Reply (RREP) are generally used in this kind of network to get routes to different nodes. These messages have a field called "Routing Metrics" and "Hop Count" which gets updated with each hop traveled. When a node initiates a Route Request it puts zero in both of these fields. Now this packet can be received by an intermediate node or a destination. In both the cases, the receiving node creates a route back to the source of the RREQ after adding their "routing metric to the neighbor" in the "Routing Metrics" field and "1" in the "Hop Count" field. It then forwards the RREQ or replies back with a RREP message as specified in the protocol. If it forwards the RREQ the receiving node does the same thing as explained before (i.e. adding route to the source route and adding the "routing metric to the neighbor" in the "Routing Metrics" field of RREQ packet and hence getting the routing metric to the source address).

The node can reply only if it has a valid route to the destination or it itself is the destination. If the node is an intermediate node, it puts the routing metric from the routing table to the field in the RREP. On receiving this RREP a node adds its "routing metric to the neighbor" who forwarded/sent this RREP. And hence has the complete routing metric to the destination concerned. RREP is forwarded to the source if the current node is not the source. Similar action is performed when the replying node is destination, except the fact that it puts zero in the "Routing Metrics" field in the RREP. This value is modified as the RREP traverses through different nodes in the way.

Figure 4:
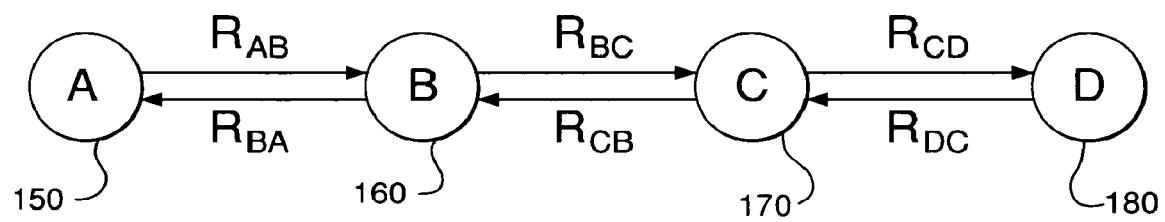
FIG. 4 is a conceptual block diagram illustrating an example of a Routing metric computation through routing packets in accordance with an embodiment of the present invention.

The following example shown in FIG. 4 is presented to clarify the procedure. FIG. 4 is an example illustrating a Routing Metric Computation through routing packets in accordance with an embodiment of the present invention.

There are four nodes shown in FIG. 4, node A 150, B 160, C 170 and D 180. The routing metrics between them are also shown in the diagram. $R_{XY}$ represent the routing metric between node X and Y. Note that due to non symmetry involved in wireless links, $R_{XY}$ can be different from $R_{YX}$. If node A wants to communicate with node D, it initiates a Route Request packet with "Routing Metrics" field set to zero. When this packet is received by node B, it adds its "routing metric to the neighbor" who forwarded the RREQ packet, in this case it is A itself, to the "Routing metrics" field in the RREQ packet and creates/updates a route to the source (i.e. node A) following the routing protocol. In this example, B will add $R_{BA}$ and zero (the current value stored in the "Routing Metrics" field) to get the routing metric to A. If it doesn't know the route to D, it forwards the RREQ packet which has $R_{BA}$ now in the "Routing Metrics" field. On receiving this packet, C does the same thing and adds $R_{CB}$ to $R_{BA}$ to get the routing metric to A. Hence it calculated the routing metric to A as: $R_{CA}=R_{BA}+R_{CB}$.

If in the example of FIG. 4, assume that C has a "fresh enough" route to D, that is, it has an unexpired route with routing metric $R_{CD}$. So it replies to the RREQ packet, and to do so it puts the routing metrics $R_{CD}$ in the "Routing Metrics" field of RREP packet and unicasts the packet to node B. On receiving such a packet node B adds its routing metric to its neighbor, which forwarded the RREP packet to it, to the "Routing Metrics" field in the RREP. In this case it will add $R_{BC}$ to $R_{CD}$ which was already present in the field. Hence it calculated the routing metric to D as: $R_{BD}=R_{BC}+R_{CD}$ A similar procedure can be used by node A when it finally receives the RREP. Hence it has the routing metric to node D as: $R_{AD}=R_{AB}+R_{BC}+R_{CD}$ A comparison of the above Routing Metric calculations is described below. Given a choice, a node should use the route with minimum route metric associated with it. The Neighbor Handling sub-module maintains a list of routes in the order of increasing route metric to the IAP. The route appearing earlier in this list is given preference over one coming later.

There can be several variations to this approach, for example, some additional bias or hysteresis can be added to prevent oscillations of routes. The "bias" can be a constant value or a function of something like metrics itself or number of hops. The use of bias is explained in the following example.

If in this example a node has a valid route to an IAP and has a metric "x" associated with it, to avoid oscillations it should not try to establish a new route unless it offers a metric which is "y" (bias) less then the current one. A still higher bias can be used if the route is towards some other IAP.

In addition to the metrics identified above, still other metrics can be used, such as battery life, bandwidth, congestion and so forth. Any such category of metrics, including the four discussed above, can be used and propagated as described above, such as in the hello message.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for calculating an optimal route between nodes in a wireless ad-hoc multi-hopping peer-to-peer communication network, the method comprising:

when one of the nodes acts as a source node and attempts to send a data packet to another one of the nodes which is a destination node which is not within direct communication with the source node, the source node transmits a route request message;

when other nodes receive the route request message, and one of those other nodes has a route to the destination node, that one of the nodes transmits a route reply message for delivery along a path including those other nodes, the route reply message including a route metric for the route between that one node and the destination node, the route metric including information representing at least one of the following: a number of hops between the source and destination node, a data rate along the route between the source and destination node, link quality along the route between the source and destination node, and information representing the types of nodes along the route between the source and destination node, and each of those other nodes, upon receipt of the route reply message, adds its respective route metric for a route between itself and the node from which it received the route reply message, before delivery of the route reply message to the source node; and the source node transmits the data packet for delivery to the destination node based on the route reply message.

2. A method as claimed in claim 1, wherein: the source node and destination node are mobile nodes.

3. A method as claimed in claim 1, wherein:

the route request message and route reply message each include respective hop count information and route metric information which are updated each time the respective message is sent from one node to another.

4. A method as claimed in claim 1, wherein:

the route metric includes information representing at least one of the following: a data rate along the route between the source and destination node, and information representing the types of nodes along the route between the source and destination node.

5. A method for calculating an optimal route between a node and a destination node through one or more other nodes including at least one neighbor node in a wireless communication network, the method comprising:

the neighbor node broadcasting a message including a routing metric from the neighbor node to the destination node;

in response to receiving the message, the node calculating a route metric to the destination node through the neighbor node by adding to the route metric in the message its respective route metric for a route between itself and the neighbor node from which it received the message and a bias associated with a type of the neighbor node, and uses this updated route metric as the route metric for the route to the node.

6. A method as claimed in claim 5, wherein:
the message is a routing message.

7. A method as claimed in claim 5, wherein:
the message is a hello message.

8. A method as claimed in claim 5, wherein:
the route metric includes information representing at least one of the following: a data rate along the route between the source and destination nodes, and information representing the types of nodes along the route between the source and destination nodes.

9. A method as claimed in claim 5, wherein:
the message is a periodic message.

10. A system for calculating an optimal route between a node and a destination node through one or more other nodes including at least one neighbor node in a wireless communication network, the system comprising:

the neighbor node, which broadcasts a message including a routing metric from the neighbor node to the destination node; and the node, comprising:

a controller for calculating a route metric to the destination node through the neighbor node by adding, upon receipt of the message, to the route metric in the message its respective route metric for a route between itself and the neighbor node from which it received the message and a bias associated with a type of the neighbor node, and uses this updated route metric as the route metric for the route to the node.

11. A system as claimed in claim 10, wherein:
the message is a routing message.

12. A system as claimed in claim 10, wherein:
the message is a hello message.

13. A system as claimed in claim 10, wherein:
the route metric includes information representing at least one of the following: a data rate along the route between the source and destination nodes, and information representing the types of nodes along the route between the source and destination nodes.

14. A system as claimed in claim 10, wherein:
the message is a periodic message.

* * * * *